W. BARTHOLOMEW.
IRONING MACHINE SHAFT SUPPORT.
APPLICATION FILED MAY 3, 1919.
1,330,832.
Patented Feb. 17, 1920.
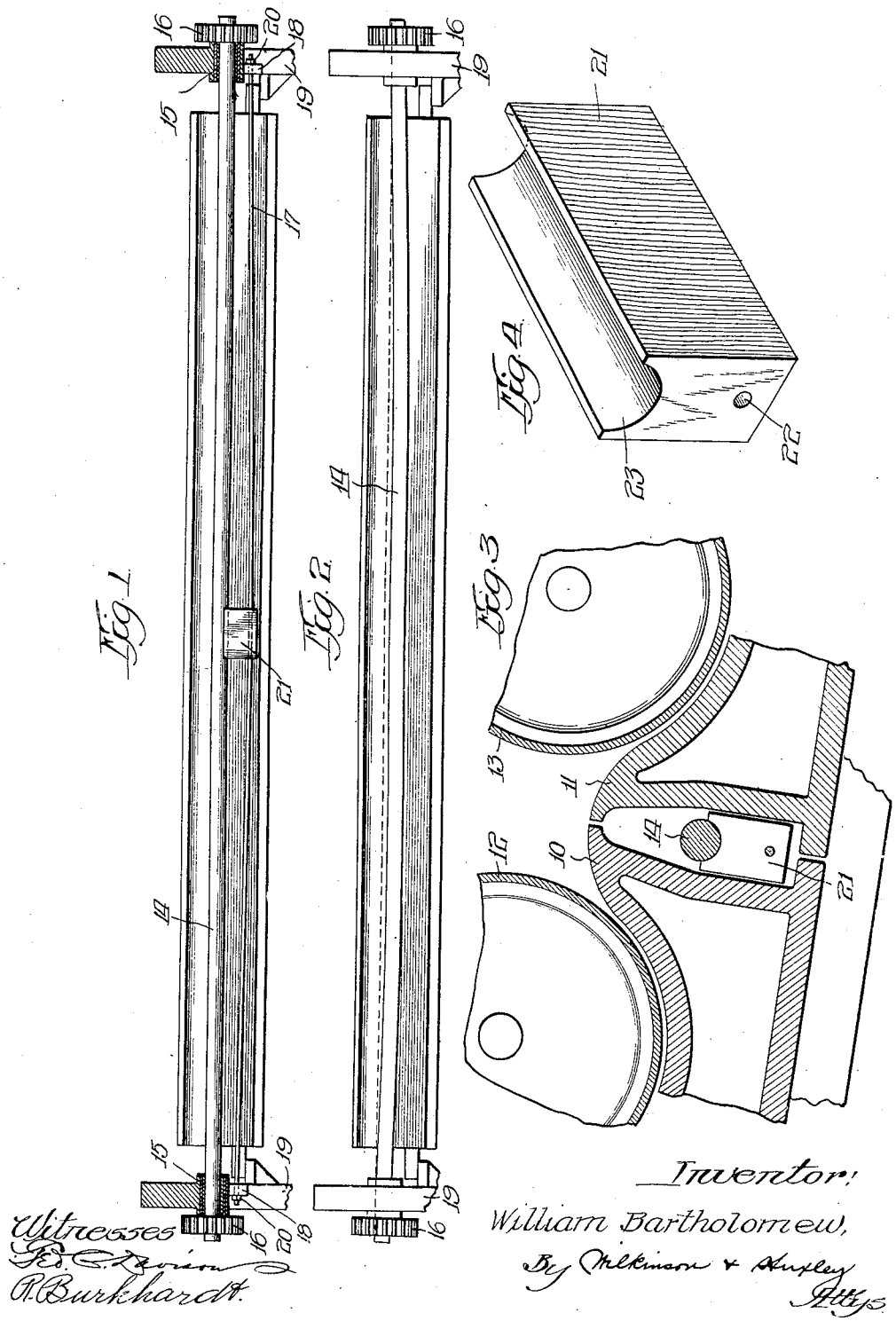
Inventor;
William Bartholomew,
By Wilkinson & Huxley
Attys

UNITED STATES PATENT OFFICE.

WILLIAM BARTHOLOMEW, OF CHICAGO, ILLINOIS, ASSIGNOR TO TROY LAUNDRY MACHINERY CO., LTD., OF CHICAGO, ILLINOIS, A CORPORATION OF NEW YORK.

IRONING-MACHINE-SHAFT SUPPORT.

1,330,832.     Specification of Letters Patent.     Patented Feb. 17, 1920.

Application filed May 3, 1919. Serial No. 294,366.

*To all whom it may concern:*

Be it known that I, WILLIAM BARTHOLOMEW, a citizen of the United States, residing at Chicago, in the county of Cook and State of Illinois, have invented certain new and useful Improvements in Ironing-Machine-Shaft Supports, of which the following is a specification.

This invention relates to ironing machine shaft supports.

Some ironing machines, and especially those used for ironing large pieces, are, of necessity, of considerable length. Transmission shafts extend throughout the length thereof and carry at their ends gear members for transmitting motion to various parts, said shafts of necessity being mounted alongside of the long integrally-formed steam chests, which cannot act as supports for said shafts. Neither can brackets be secured to these steam chests for supporting the shafts, because steam leakages are apt to occur if the chests are perforated for fastening the brackets or supports thereto.

Furthermore, these steam chests expand and contract in accordance with varying temperature conditions, also making it undesirable to attempt to secure shaft supporting brackets thereto.

It has been found in practice that these long shafts, however, need supporting intermediate their ends, for if no support is provided, the shafts sag, causing undue wearing of the bearings and causing the gears at the ends of the shafts to wear improperly and mesh badly with mating gears.

Accordingly, one object of my invention is to properly support a long shaft of an ironing machine intermediate its ends in a manner to overcome the undesirable features above-mentioned and to meet the requirements for the particular use.

Another object of my invention is to provide a simple and effective shaft which may be adjusted in accordance with existing conditions.

These and other objects are accomplished by means of the arrangement disclosed on the accompanying sheet of drawings, in which—

Figure 1 is a fragmentary front elevation, parts being in section, of an ironing machine showing a shaft thereof supported in accordance with my invention;

Fig. 2 is a similar view, showing the shaft in sagging position as a result of being unsupported intermediate its ends;

Fig. 3 is a fragmentary sectional view through steam chests and cylinders of an ironing machine, showing the location and method of supporting a transmission shaft intermediate its ends; and Fig. 4 is a bearing block forming a part of the intermediate shaft support.

The various novel features of my invention will be apparent from the following description and drawings, and will be particularly pointed out in the appended claims.

Referring to the figures of the drawings, it will be noted that I have shown my invention in connection with an ironing machine having steam chests 10 and 11, provided with curved surfaces, with which cylinders 12 and 13 coöperate respectively. A transmission shaft, or shafts, 14 extend lengthwise alongside of the steam chests 10 and 11; and, as shown in Fig. 3, the shaft 14 is located intermediate adjacent steam chests 10 and 11. These shafts 14 are supported at their ends in bearings 15, said shafts at their ends carrying gears 16, which mesh with coöperating gearing members (not shown) for driving purposes.

It is evident that these long shafts 14 will sag intermediate their ends as shown in Fig. 2 unless supported. Heretofore, however, these shafts have not been supported intermediate their ends, thereby causing the bearings 15 to become worn unevenly and worn out prematurely, causing the gears 16 to assume an angular position with respect to mating gears, resulting in a pinching action of the gears and undue wearing at certain portions thereof. The sagging of the shaft, in other words, causes inefficient and unsatisfactory operation; at the same time greatly increasing the repair cost.

While it has been appreciated for some time that these shafts should be supported intermediate their ends, a peculiar problem was encountered, in that no suitable place could be found to support a bracket which would support a shaft bearing intermediate the ends of the shaft. The steam chests could not be perforated or otherwise used as a support for shaft supporting brackets.

In solving the problem, a tension rod 17 has been provided, which extends lengthwise of the ironing machine alongside of the steam chests and shafts 14, the ends of which tension rods pass through ears 18 on the machine pedestals 19; the threaded ends of said rod being provided with nuts 20, whereby the tension of the rod may be varied.

This tension rod carries a bearing block 21, and preferably extends through a longitudinal opening 22 therein, said block being provided with a grooved-out portion 23, in which the associated shaft 14 rests. As shown in Figs. 1 and 3, the bearing block 21 is in its normal position for supporting its associated shaft intermediate the ends thereof. It will be appreciated that the tighter the nuts 20 are drawn, the greater the tension in the rod 17 will be, and the greater the shaft supporting action will be. All sag in the shaft will be eliminated and the attendant objectionable features of bearing and gear wear will be overcome. The intermediate shaft, in effect, is a floating support, the block being suspended in adjusted position in accordance with the adjustment of the nuts 20 at the ends of the tension rod 17.

It is my intention to cover all modifications of the invention falling within the spirit and scope of the following claims.

I claim:

1. In an ironing machine, a shaft supported at its ends, a bearing block for an intermediate portion of said shaft, and means under tension extending lengthwise of the shaft for holding said bearing block in supporting position to prevent sagging of the shaft.

2. In an ironing machine, a shaft supported at its ends, a rod extending alongside of said shaft, and a bearing block supported by said rod and supporting an intermediate point of said shaft to prevent sagging thereof.

3. In an ironing machine, a shaft supported at its ends, a rod extending alongside of said shaft, a bearing block supported by said rod and supporting an intermediate point of said shaft to prevent sagging thereof, and means for varying the supporting effect of said block.

4. In an ironing machine, a shaft supported at its ends, a tension rod extending along said shaft, a bearing member carried by said rod for supporting the shaft intermediate its ends to prevent sagging, and means for changing the tension in said rod for changing the supporting effect on the shaft intermediate its ends.

5. In an ironing machine, a shaft supported at its ends, an apertured bearing block for engaging the shaft intermediate its ends for preventing sagging of the shaft, and a rod passing through said aperture for supporting said block.

6. In an ironing machine, a shaft supported at its ends, an apertured bearing block for engaging the shaft intermediate its ends for preventing sagging of the shaft, a rod passing through said aperture for supporting said block, and means for changing the supporting effect of said rod.

Signed at Chicago, Illinois, this 30th day of April, 1919.

WILLIAM BARTHOLOMEW.